United States Patent [19]

Tanigawa et al.

[11] Patent Number: 5,185,017
[45] Date of Patent: Feb. 9, 1993

[54] GAS-LIQUID CONTACT APPARATUS

[75] Inventors: Shogo Tanigawa; Takeshi Yokoyama, both of Tamano; Yoshikazu Izawa, Tokyo, all of Japan

[73] Assignee: Mitsui Engineering & Shipbuilding Co., Ltd., Tokyo, Japan

[21] Appl. No.: 864,718

[22] Filed: Apr. 8, 1992

[30] Foreign Application Priority Data

Apr. 15, 1991 [JP] Japan ................. 3-082407

[51] Int. Cl.⁵ ................................. B01F 5/00
[52] U.S. Cl. ................... 55/257.2; 55/257.5; 261/114.2
[58] Field of Search ............. 261/114.2; 55/257.2, 55/257.5

[56] References Cited

U.S. PATENT DOCUMENTS

| | | | |
|---|---|---|---|
| 1,673,895 | 6/1928 | Alexander | 261/114.2 |
| 2,753,166 | 7/1956 | Bergman | 261/114.2 |
| 2,890,870 | 6/1959 | Spiselman | 55/257.5 |
| 2,893,713 | 7/1959 | Haltmeier | 261/114.2 |
| 3,799,512 | 3/1974 | Raybon | 55/257.5 |
| 4,192,835 | 3/1980 | Powers | 261/114.2 |

Primary Examiner—Tim Miles
Attorney, Agent, or Firm—Nikaido, Marmelstein, Murray & Oram

[57] ABSTRACT

Disclosed is a gas-liquid contact apparatus wherein trays are disposed in the form of column plates inside a column, a cap having a cover but not bottom and equipped with a large number of guide blades at its side portion is disposed at the hole portion of each tray and a large number of outflow ports are so disposed as to be positioned below the liquid surface of the liquid held on the tray, characterized in that a large number of side holes positioned between the lower end of the guide blades and the liquid surface on the tray are disposed at the side portion of the cap.

1 Claim, 4 Drawing Sheets

GAS-LIQUID CONTACT APPARATUS

BACKGROUND OF THE INVENTION

This invention relates to a gas-liquid contact apparatus which involves heat movement or material movement between a gas and a liquid in a distilling column, an absorption tower, and so forth.

A plate column type gas-liquid contact apparatus has been used mostly in the past for a distilling column or an absorption tower, and the inventors of the present invention, too, have made various improvements and proposals for this kind of apparatuses (refer to Japanese Patent Publication Nos. 49-45131 and 46-31321).

The former is so constituted as to increase the contact by disposing partitions inside a caplike gas-liquid contact structure member. Though this apparatus exhibits excellent effects when a processing quantity is relatively small or when a processing quantity is stable, the flow of the gas is disturbed and an operation under a stable state cannot be made when the processing quantity increases.

The latter is constituted in such a manner as to blow off a liquid flowing down from a tray and to separate the gas and the liquid from a gas-liquid multi-phase flow by a cap consisting of a cylinder having a large number of pores and a ceiling plate. In this apparatus, however, the gas and the liquid are separated only when the gas-liquid multiphase flow is jetted from a porous member at the side portion of the cap. Therefore, the gas-liquid separation becomes more difficult with the increase of a load. Furthermore, an excellent gas-liquid contact cannot be expected due to so-called "entrainment" in which the ascending gas flow is accompanied by a large number of droplets.

On the other hand, a plate column type mist catcher has been proposed as an apparatus for the gas-liquid separation (Japanese Patent Application Kokai Publication No. 52-149265). In this apparatus, a cap having a cover but not a bottom is disposed at an open portion of a column plate, the side portion of this cap is bored, a guide blade is disposed outside this open hole and a liquid pocket is formed at the tip of the guide blade. A gas containing a mist is caused to impinge against this liquid pocket to separate the mist, and the separated liquid is guided to a tray at a lower portion.

This apparatus exhibits an excellent effect when a gas-liquid separation at a constant flow rate is made but when the flow rate of the gas-liquid changes, entrainment becomes more vigorous, and the gas-liquid separation cannot be made accurately. In particular, there is the problem that the gas flowing down along the guide blade disturbs the liquid surface on the tray and increase entrainment.

SUMMARY OF THE INVENTION

The present invention is devised so as to solve these problems with the prior art, and an object of the present invention is to provide a gas-liquid contact apparatus which prevents disturbance of a tray liquid surface resulting from the gas flowing down along a guide blade of a cap, and can reduce a passage resistance of a gas-liquid multiphase flow passing through the cap.

In a gas-liquid contact apparatus wherein perforated trays are disposed in the form of plate column inside a column, the hole portion of each tray is covered with a cap having a cover but not a bottom and having also a large number of openings on its side, a large number of guide blades are radially disposed outside and on the side of the cap, a liquid pocket is formed at the tip of each guide blade, and a large number of outflow ports positioned below the liquid level of the liquid held on the tray are disposed at the side portion of the cap, the gas-liquid contact apparatus capable of accomplishing the object of the present invention described above is characterized in that a large number of side holes are so disposed at the side portion of the cap as to be positioned between the lower end portions of the guide blades and the liquid surface on the tray.

Since a large number of side holes positioned between the lower end portion of the guide blades of the cap and the liquid surface of the liquid held on the tray are disposed on the side portion of the cap as described above, the gas flowing down along the guide blades of the cap are blown off by the gas or gas-liquid multiphase flow jetted from a large number of side holes disposed in the cap, and the fluctuation of the liquid surface held on the tray can be prevented. As a result, since the liquid surface on the tray can be kept constant, a processing quantity can be increased without lowering stage efficiency. Furthermore, part of the gas or gas-liquid multiphase flow passing through the inside of the cap is bypassed through the side holes, and the air flow resistance of the cap can be reduced.

DESCRIPTION OF THE PREFERRED EMBODIMENTS

Hereinafter, an embodiment of the present invention will be explained with reference to the drawings.

Figure 1:
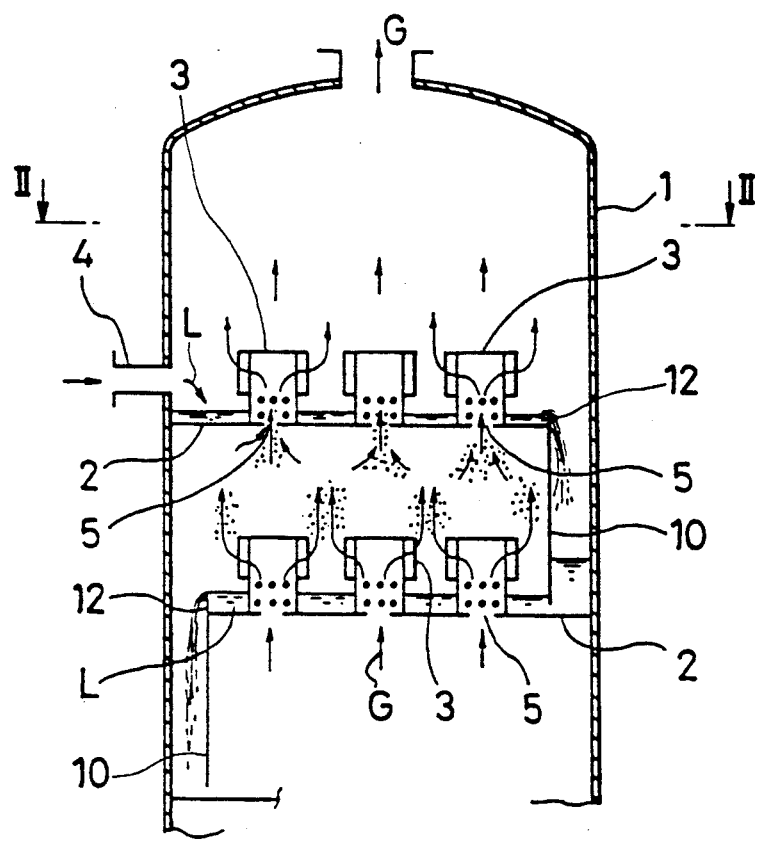
FIG. 1 is a longitudinal sectional view of a gas-liquid contact apparatus according to the present invention.
Figure 2:
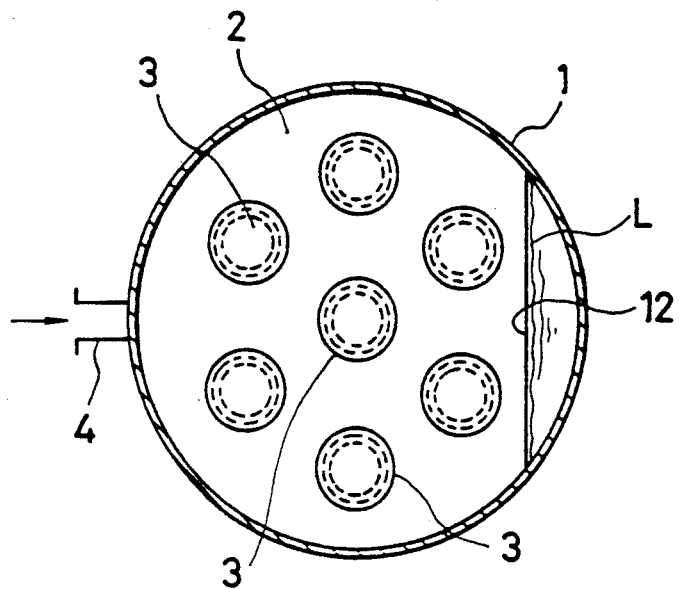
FIG. 2 is a sectional view taken along a line II—II of FIG. 1.

In FIG. 1, reference numeral 1 denotes a cylindrical column main body which stands upright. A large number of trays 2 are disposed in the form of column plates with gaps of about 300 to about 600 mm between them in a vertical direction inside the column main body. A large number of caps 3 for gas-liquid contact are disposed on the trays 2, respectively. A liquid L flowing from a feed port 4 at a side portion of the column main body comes into contact with a gas G ascending up through through-holes 5 bored in each tray 2 and part of the liquid L flows over a weir 12 fitted to each tray 2 and flows down along a down-comer 10.

Figure 3:
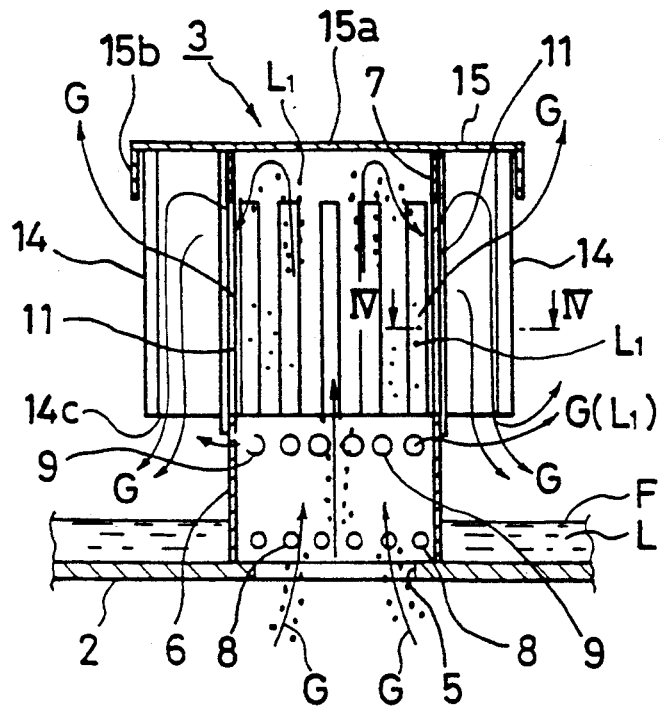
FIG. 3 is an enlarged sectional view of the principal portions of the gas-liquid contact apparatus according to the present invention.

As shown in FIG. 3, each cap 3 comprises mainly a skirt 6, a cover 15, an inner cylinder 7 and guide blades 14. The skirt 6 is cylindrical and is so fixed on the tray 2 as to be concentric with the annular through-hole 5. A large number of outflow ports 8 are so disposed on the periphery of the skirt 6 as to be positioned below the liquid surface F of the liquid L held on the tray 2.

On the other hand, a cover 15 is fixed to the upper part of the skirt 6 through an inner cylinder 7. The cover 15 comprises a disc 15a and a cylindrical flange 15b fixed around the disc 15a. The inner cylinder 7 has the same diameter as the skirt 6, and a large number of slit-like openings 11 are formed at the side part of the inner cylinder 7. Furthermore, a large number of guide blades 14 are radially fixed to the outside of the inner cylinder 7.

Figure 4:
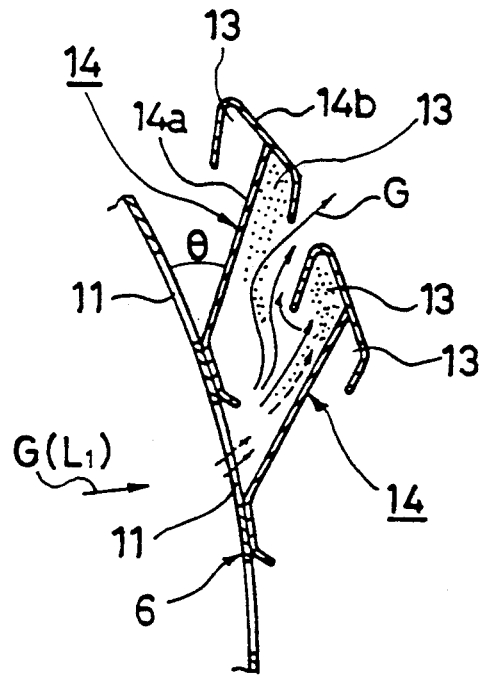
FIG. 4 is a sectional view taken along a line IV—IV of FIG. 3.

As shown in FIG. 4, each guide blade 14 comprises a guide plate 14a and a U-shaped pocket plate 14b fixed to the tip of the guide plate 14a. The pocket plate 14b has a liquid pocket 13 thereinside. The guide plate 14a is fixed to the outside of the inner cylinder 7 clear of the opening 11 and is fitted obliquely with respect to the peripheral surface of the inner cylinder 7. The angle of inclination $\theta$ of this guide plate 14a is preferably from 25° to 30°.

As shown in FIG. 3, a large number of side holes 9 are so disposed around the skirt 6 as to be positioned between the lower end portion 14c of the guide blade 14 and the liquid surface F of the liquid L held on the tray 2.

A general dimension of the cap 3 is such that the height is 350 mm, the inner diameter of the inner cylinder 7 is 200 mm, the outer diameter of the guide blade 14 is 260 mm, the height of the guide plate 14 is 190 mm and the diameter of the side holes 9 is 20 mm. Twenty-one side holes 9 are uniformly distributed in the peripheral direction of the skirt 6. Furthermore, the gap between the lower end portion 14c of the guide blade and the upper end of the side hole 9 is from 10 to 20 mm. The height from the liquid surface F of the liquid L held on the tray 2 to the lower end of the side hole 9 is preferably twice to thrice the diameter of the side hole 9.

Next, the flow of the gas-liquid will be explained with reference to FIGS. 1 to 4.

The gas G enters the cap 3 through the through-hole 5 of the tray 2 and the major proportion of this gas G impinge against the cover 15 of the cap 3 while mixing with droplets or mists $L_1$. Then, they change their direction in the radial direction, join with the gas G flowing directly towards the guide blade 14 and with the mists $L_1$, pass through the side openings 11 of the inner cylinder 7 and impinge against the inside of the guide blade 14. Due to the inertia at the time of passage through this gap, the droplets or mists $L_1$ gather as a liquid film at the liquid pocket 13, fall down to the tray 2 therebelow due to the gravitational force, and are collected. After the separation of the mist, the gas G flows upward from the guide blade 14 and is emitted outside the column from the top of the column main body 1.

On the other hand, the gas G flowing down along the guide blade 14 is blown off in the radial direction of the cap 3 by the gas G or mist $L_1$ jetted radially from a large number of side holes 9 so disposed as to be positioned between the lower end portion 14c of the guide blade 14 and the liquid surface F on the tray 2 and does not reach the liquid surface F of the liquid L held on the tray 2. Accordingly, disturbance of the liquid surface F on the tray 2 can be prevented.

Next, the apparatus of the present invention equipped with the caps 3 having the side holes 9 will be explained in comparison with the prior art apparatus equipped with the caps not having such side holes.

Figure 5:
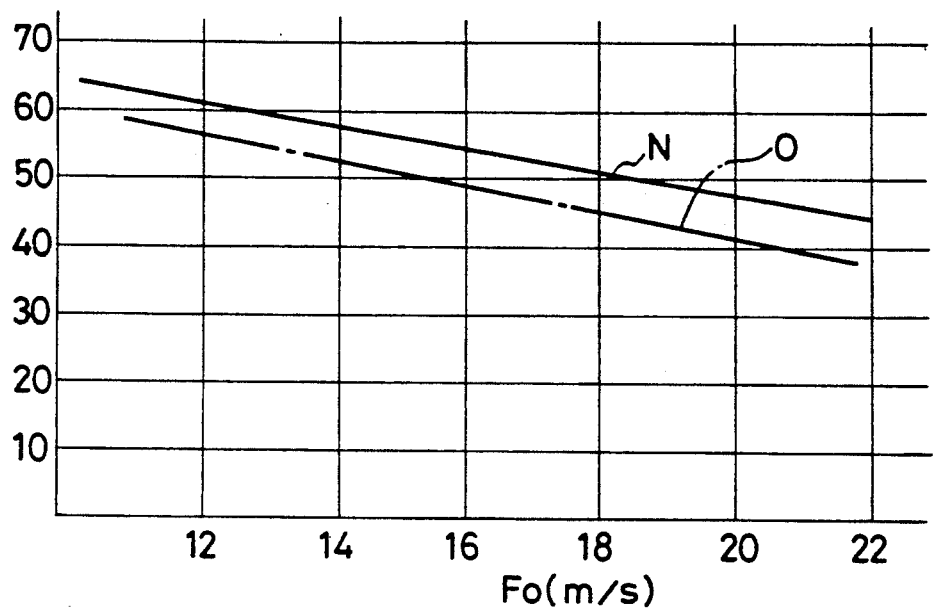
FIG. 5 is a diagram showing total reflux efficiency.

FIG. 5 is a diagram showing a total reflux (normal pressure) efficiency data in a cyclohexane-N-heptane system in a distillation apparatus drawn by the use of a kinetic energy index obtained by density correcting a linear velocity by parameters relating to a flow velocity at the through-hole of the tray as the reference, whereby column efficiency is plotted on the ordinate, and the kinetic energy index on the abscissa. A solid line N represents the data of the apparatus of the present invention and a one-dot-chain line does the data of the conventional apparatus. It can be appreciated from this FIG. 8 that total reflux efficiency is improved by about 5 to about 8% by the apparatus of the present invention over the conventional apparatus.

Figure 6:
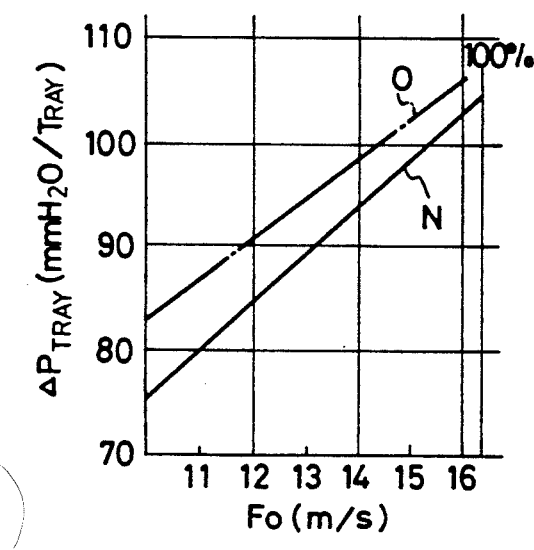
FIG. 6 is a diagram showing a pressure loss.

In FIG. 6, resistance on the gas side per stage in terms of a tray total pressure loss is plotted on the ordinate, and the kinetic energy index on the abscissa, in the same way as in FIG. 5. It can be appreciated that the total pressure loss is improved by about 10 to about 20% by the apparatus of the present invention over the prior art apparatus.

Figure 7:
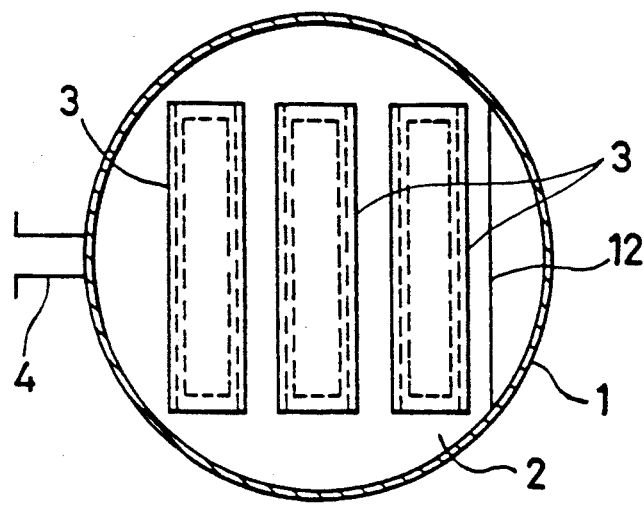
FIG. 7 is an explanatory view showing another shape of a cap.

The planar shape of the cap 3 described above may be round as shown in FIG. 2 or may be rectangular as shown in FIG. 7, and the most suitable structure can be employed in accordance with the cap capacity.

Figure 8:
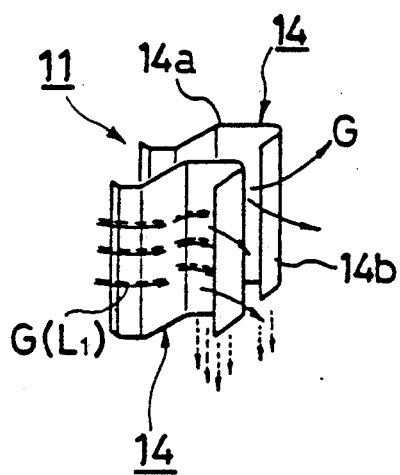
FIGS. 8 and 9 are explanatory views showing other shapes of guide blades.
Figure 9:
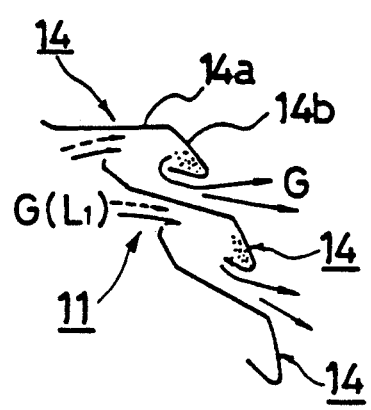

The guide blade 14 may be integrally formed by bending one sheet into a substantially J-shape as shown in FIGS. 8 and 9.

What is claimed is:

1. A gas-liquid contact apparatus of the type wherein perforated trays are disposed in the form of column plates inside a column, the hole portion of each of said trays is covered with a cap having a cover but not a bottom and equipped with a large number of openings at the side portion, a large number of guide blades are disposed radially outside the side portion of said cap, a liquid pocket is defined at the tip of each of said guide blades and a large number of outflow ports positioned below the liquid surface of the liquid held on said tray are disposed at the side portion of said cap, characterized in that a large number of side holes positioned between the lower end of said guide blades and the liquid surface on said trays are disposed at the side portion of said cap.

* * * * *